(12) United States Patent
Becher et al.

(10) Patent No.: US 10,816,961 B2
(45) Date of Patent: Oct. 27, 2020

(54) METHOD FOR MANUFACTURING A PRODUCT ACCORDING TO A PRODUCTION PLAN

(71) Applicant: SIEMENS AKTIENGESELLSCHAFT, Munich (DE)

(72) Inventors: Silvio Becher, Munich (DE); Dagmar Beyer, Munich (DE); Jan-Gregor Fischer, Zorneding (DE); Steffen Lamparter, Feldkirchen (DE); Michael Pirker, Lenggries (DE)

(73) Assignee: Siemens Aktiengesellschaft, Munich (DE)

( * ) Notice: Subject to any disclaimer, the term of this patent is extended or adjusted under 35 U.S.C. 154(b) by 109 days.

(21) Appl. No.: 15/553,459

(22) PCT Filed: Feb. 25, 2015

(86) PCT No.: PCT/EP2015/053936
§ 371 (c)(1),
(2) Date: Aug. 24, 2017

(87) PCT Pub. No.: WO2016/134761
PCT Pub. Date: Sep. 1, 2016

(65) Prior Publication Data
US 2018/0246500 A1 Aug. 30, 2018

(51) Int. Cl.
*G05B 19/418* (2006.01)
*G06Q 50/04* (2012.01)

(52) U.S. Cl.
CPC ....... *G05B 19/41865* (2013.01); *G06Q 50/04* (2013.01); *G05B 2219/32088* (2013.01); *Y02P 90/30* (2015.11)

(58) Field of Classification Search
None
See application file for complete search history.

(56) References Cited

U.S. PATENT DOCUMENTS

| 5,557,834 A | 9/1996 | Miyanaka et al. |
| 5,781,746 A * | 7/1998 | Fleck ................. G06F 13/4018 710/306 |

(Continued)

FOREIGN PATENT DOCUMENTS

| CN | 101118624 A | 2/2008 |
| CN | 101655715 A | 2/2010 |

(Continued)

OTHER PUBLICATIONS

Hanzawa, "Two-mode PLC-based mode multi/demultiplexer for mode and wavelength division multiplexed transmission", Oct. 2013, Optics Express, pp. 8-9 (Year: 2013).*

(Continued)

*Primary Examiner* — Mohammad Ali
*Assistant Examiner* — David Earl Ogg
(74) *Attorney, Agent, or Firm* — Lempia Summerfield Katz LLC

(57) ABSTRACT

A method for manufacturing a product according to a production plan includes a plurality of production steps. The method includes providing a plurality of production modules, for each production step of the plurality of production steps, independently executing a negotiation process for selecting a production module, and disposing the selected production modules, each selected for performing one of the production steps, for performing the plurality of production steps. The negotiation process includes designating production modules that are capable of performing the production step, assigning module parameters to the designated production modules, calculating a cost for each of the designated production modules based on the module (Continued)

parameters of the respective production module, and selecting one of the designated production modules as a function of the calculated cost.

17 Claims, 4 Drawing Sheets

(56) References Cited

U.S. PATENT DOCUMENTS

| | | | |
|---|---|---|---|
| 5,826,236 A | 10/1998 | Narimatsu et al. | |
| 6,091,998 A * | 7/2000 | Vasko | G05B 19/41865 700/100 |
| 6,349,237 B1 * | 2/2002 | Koren | B23Q 37/00 700/96 |
| 6,400,999 B1 * | 6/2002 | Kashiyama | G05B 19/41865 700/100 |
| 7,689,463 B1 | 3/2010 | Mesaros | |
| 8,738,462 B2 | 5/2014 | Mesaros | |
| 2002/0026257 A1 * | 2/2002 | Newmark | G05B 19/41805 700/108 |
| 2002/0046157 A1 | 4/2002 | Solomon | |
| 2006/0291613 A1 * | 12/2006 | Bernhardt | G06T 5/10 378/4 |
| 2008/0066072 A1 * | 3/2008 | Yurekli | G06Q 10/06 718/104 |
| 2009/0306823 A1 * | 12/2009 | Baltes | G05D 1/0274 700/245 |
| 2011/0258847 A1 * | 10/2011 | Meisho | B23P 19/00 29/700 |
| 2012/0078769 A1 | 3/2012 | Becher et al. | |
| 2015/0316911 A1 * | 11/2015 | Rischar | G05B 15/02 700/9 |

FOREIGN PATENT DOCUMENTS

| | | |
|---|---|---|
| CN | 102233526 A | 11/2011 |
| WO | WO03067494 A1 | 8/2003 |

OTHER PUBLICATIONS

Caridi Maria et al: "Multi-agent systems in production planning and control: An application to the scheduling of mixed-model assembly lines"; International Journal of Production Economics; vol. 68 No. 1; pp: 29-42; XP55223123; ISSN: 0925-5273; DOI: 10.1016/S0925-5273(99)00097-3.

PCT International Search Report and Written Opinion of the International Searching Authority dated Nov. 4, 2015 for corresponding PCT/EP2015/053963.

Rizvan Erol et al: "A multi-agent based approach to dynamic scheduling of machines and automated guided vehicles in manufacturing systems"; Applied Soft Computing; Elsevier; Amsterdam; NL; vol. 12 No. 6; pp: 1720-1732; XP028406300; ISSN: 1568-4946; DOI: 10.1016/J.ASOC.2012.02.001.

Chinese Office Action for Chinese Application No. 201580076506.3 dated Feb. 3, 2020, with English translation.

* cited by examiner

METHOD FOR MANUFACTURING A PRODUCT ACCORDING TO A PRODUCTION PLAN

CROSS REFERENCE TO RELATED APPLICATIONS

The present patent document is a § 371 nationalization of PCT Application Serial Number PCT/EP2015/053936 filed on Feb. 25, 2015 which is hereby incorporated in its entirety by reference.

FIELD

Embodiments relate to a manufacturing facility and a method for manufacturing a product according to a production plan including a plurality of production steps.

BACKGROUND

There is an increasing demand for adaptable production systems that allow for fast extension, downsizing of production lines, seamless substitution of production resources and the shift from mass production towards mass customization. Key performance indicators such as production time, throughput, re-configuration time and resource utilization may be improved.

SUMMARY AND DESCRIPTION

The scope of the present invention is defined solely by the appended claims and is not affected to any degree by the statements within this summary. The present embodiments may obviate one or more of the drawbacks or limitations in the related art.

Embodiments provide a method that allows for a dynamic interaction of different production modules based on negotiation mechanisms.

According to an embodiment, a method for manufacturing a product according to a production plan includes a plurality of production steps. The method includes providing a plurality of production modules for each production act. A negotiation process is independently executed for selecting a production module. The process includes designating production modules that are capable of performing the production step, assigning module parameters to the designated production modules, calculating a cost for each of the designated production modules based on the module parameters of the respective production module, selecting one of the designated production modules as a function of the calculated cost, and disposing the selected production modules. Each designation production module is selected for performing one of the plurality of production steps.

The time and computing capacity required for determining a proper set of production modules may be reduced by independently executing the negotiation process for each of the production steps.

Each of the plurality of production step may include one or more production services. A production service refers to any kind of operation that may be required for manufacturing a product. Those production modules that are able to perform all production services of the production step are designated at the beginning of the negotiation process. The production modules may perform one or more production services that include a physical, chemical, mechanical, biological and/or electrical operation or a combination thereof. For example, a production service may include joining, welding, soldering, drilling, milling, cutting, assembling, depositing, deforming, heating, cooling, arranging, stacking, separating, etc.

A production plan may relate to a plan for a future production, in which required production resources, e.g. facilities, raw materials, production modules, etc., are determined and arranged.

The production plan may relate to a plan that indicates production steps required for manufacturing a product. The production plan may be provided as a listing of production steps that are required to be performed in a specific order in order to manufacture a product. The production plan may be formed as an array, a list, a table, a schedule, a register, a data sheet and/or a catalog and, for example, provided in an electronic data carrier.

Each of the production steps may include one or more production services including, for example, joining, welding, soldering, drilling, milling, cutting, assembling, depositing, deforming, heating, cooling, arranging, stacking, separating, etc.

Production modules that are capable of performing the production service(s) may be instantiated by a mill, drill, welding device, solder device, robot arm, mold, press, etc.

Properties of the designated production modules that may be relevant for any of the production steps are termed "operation parameters". The operation parameters may include an energy and/or power consumption, operation costs, a required duration for performing the production service and/or actual characteristics including a temperature, an operating time, a workload, a wear. Furthermore, the operation parameters may include a quality, a precision, an accuracy and/or an error rate.

The module parameters are a subset of the operation parameters that are relevant for the production step for which the negotiation process is executed. The module parameters may be specified by the production plan and/or the respective production steps and vary over time.

During the negotiation process, the module parameters of the designated modules and requirements from the production plan may be converted into a combined parameter having a uniform dimension and/or unit. The combined parameter is termed cost. The cost is calculated for each of the designated production modules based on the module parameters. For example, each of the module parameters may be multiplied by an individual weighting factor. Depending on the production step, different weighting factors may be applied to the module parameters. For example, if a fast performance is more important than an energy saving performance for a specific production step, the required duration may be multiplied by a higher weighting factor than the energy consumption for the calculation of the cost.

The calculated cost may differ among the designated production modules. For example, the designated production module with a lowest calculated cost or with a calculated cost that is within a specific range may be selected during the negotiation process. "As a function" may be interpreted as meaning "based on", "in dependence of" or "by help of" for example.

Disposing the selected production modules may include, for example, positioning the selected production modules to respective production sites, powering up the selected production modules and/or connecting the selected production modules to an assembly line.

According to an embodiment, the method further includes manufacturing the product by performing the plurality of production steps according to the production plan where each selected production module performs the corresponding production step.

After the selected production modules are disposed for performing the production steps, the selected production modules perform the production steps in order to manufacture the product according to the production plan.

The production plan may include a production order in which the plurality of production steps is to be performed. Accordingly, an order of the selected production modules that perform the production steps needs to be configured to the production order of the production plan.

According to a further embodiment, the method further includes splitting the plurality of production steps into single production steps and simultaneously executing a plurality of negotiation processes. Each of a plurality of negotiation processes is executed for each single production step.

The plurality of negotiation processes are executed independently and simultaneously. Splitting the plurality of production steps into single production steps may be performed using a multiplexer device.

According to a further embodiment, the method further includes assigning a production time-limit to the production plan. Designating production modules includes designating production modules that are capable of performing the production step within the production time limit.

The production time-limit may be a latest time point for manufacturing the product. Each of the production modules may regularly self-subscribe an availability, e.g. a time interval in which the module parameter is expected to be idle, e.g. has no production service to perform. Only those production modules having an availability within the production time-limit may be designated.

According to a further embodiment, the method further includes assigning at least one partial time-limit to at least one of the plurality of production steps. Designating production modules includes designating production modules that are capable of performing the production step within the partial time-limit.

At least one production step of the production plan may be a time-limited production step, e.g. the production step is performed within the partial time-limit. During the negotiation process for the time-limited production step, only those production modules that are capable of performing the production service(s) required for the time-limited production step within the partial time-limit may be designated.

According to a further embodiment, the negotiation process further includes outputting a failure if no production module is designated.

According to a further embodiment, the production plan has a maximum cost, and the negotiation process further includes outputting a failure if the calculated cost for the designated production modules exceeds the maximum cost. Outputting a failure may include generating a failure message, flag, signal or the like in a computer system.

In addition to the plurality of production steps, the production plan may include one or more requirements for performing the production steps, e.g. the production time-limit, the partial time-limit(s) and/or a maximum cost. A failure may be output from the negotiation process, if no production modules are found that match the requirements from the production plan.

According to a further embodiment, the method further includes altering the production time-limit and/or the partial time-limit if the negotiation process outputs a failure.

According to a further embodiment, the method further includes withdrawing the production plan if the negotiation process outputs a failure.

If none of the plurality of production modules are capable of performing the production step, for example within the production time-limit and/or the partial time-limit according to the production plan, a failure may be output from the negotiation process. The production plan may be modified e.g. by altering, for example by prolonging and/or shifting, the production and/or partial time-limit. The negotiation process is executed with respect to the altered production time-limit and/or the altered partial time-limit.

Alternatively or additionally, the production plan may be withdrawn if a failure is output from the negotiation process. For example, a temporarily occupied memory and/or a busy computing capacity that is used for executing the negotiation process might be cleared by withdraw of the production plan.

A further embodiment includes selecting a designated production module having a minimum calculated cost.

The calculation of the cost may be modified by adjusting the weighting factors for each of the module parameters. Accordingly, the calculation of the cost may be modified in such a way that, for example, the best conditions for performing the production step is given by the designated production module having the minimum calculated cost.

According to a further embodiment, the method further includes providing, by the plurality of production modules, an availability and module parameters of each of the plurality of production modules.

Each of the plurality of production modules may be configured to communicate and/or submit an availability and module parameters, for example, to a control unit. For example, the control unit may be configured to execute a plurality of negotiation processes. For example, the control unit may include an agent platform, a data processing unit and/or a processor.

According to a further embodiment, at least one production module is selected and/or disposed for performing a plurality of production steps of a production plan.

One or more production modules may be selected and disposed for performing multiple production steps of the production plan. For example, a loop or an appropriate transportation mechanism may be required.

In an embodiment, a manufacturing facility is suggested. The manufacturing facility includes a plurality of production modules, a production input and a control unit. Each of the plurality of production modules includes an assigned set of module parameters. The production input is configured to receive a production plan for manufacturing a product. The production plan includes a plurality of production steps. Each of the production steps is constituted by at least one production service. The control unit is configured to execute a plurality of negotiation processes. Each negotiation process is executed for selecting one of the plurality of production modules for performing a production step. Each of the plurality of production modules is configured to submit the own set of module parameters to the control unit. The selected production modules are configured to manufacture the product by performing the plurality of production steps.

The manufacturing facility may be configured for manufacturing the product by applying the aforementioned method. For example, the control unit executes one or more negotiation processes according to the negotiation process of the method described above. The production modules of the manufacturing facilities may correspond to the production modules of the method described above. The production steps and the production services correspond to the production steps and the production services of the aforementioned method.

The manufacturing facility provides production resources in terms of the plurality of production modules. The control unit may include an electronic data processing unit, for example, a computer, an integrated-circuit chip and/or a processor.

Furthermore, the production modules may include auxiliary production modules that may perform auxiliary production services, e.g. transportation, supply and/or storage that are not included as production steps in the production plan.

According to a further embodiment, the manufacturing facility further includes a multiplexer device. The multiplexer device is configured to split the plurality of production steps of the production plan into single production steps. The multiplexer device is configured for feed the single production steps to the control unit.

The multiplexer device may be connected between the production input and the control unit and configured to convert the plurality of production steps from the input production plan into single production steps and feed the single production steps to the control unit that may be configured to execute the plurality of negotiation processes simultaneously and independently from each other. Each of the plurality of negotiation processes is executed for selecting one production module for performing one of the single production step.

According to a further embodiment, the control unit is configured to execute the plurality of negotiation processes according to a double auction.

A double auction is a process of buying and selling goods at a virtual market place, where potential buyers and potential sellers simultaneously submit the requests and offers, respectively. During the double auction, both buyers and sellers may adapt the requests and offers, respectively. All participants are informed about a current status on the market, without individual preferences, e.g. request and offer limits, of each participant disclosed.

In terms of the double auction, the negotiation process may include the production steps as the potential buyers and the production modules as the potential sellers. The production steps submit the requests, separated by the multiplexer device, to the control unit that acts as the market. At the same time, the production modules submit the module parameters, that may be regarded as the offers in terms of the double auction, to the control unit. The cost is calculated in order to adapt the dimensions of the offers to that of the requests.

Alternatively or additionally, the principle of a continuous auction may be applied, hence allowing the requests by the production steps and/or the offers from the production modules may be varied during the negotiation process.

The respective entity, e.g. the processing entity, may be implemented in hardware and/or in software. The entity may be embodied as a device, e.g. as a computer or as a processor or as a part of a system, e.g. a computer system. The entity may be embodied as a computer program product, as a function, as a routine, as a program code or as an executable object.

It is understood that the sequence of the steps of the method disclosed here is not binding but may be interchanged.

In an embodiment, a computer program product including a program code for executing the above-described method for manufacturing a product according to a production plan including a plurality of production steps, when run on at least one computer is provided.

A computer program product, such as a computer program, may be embodied as a memory card, USB stick, CD-ROM, DVD or as a file that may be downloaded from a server in a network. For example, such a file may be provided by transferring the file including the computer program product from a wireless communication network.

DETAILED DESCRIPTION

Figure 1:
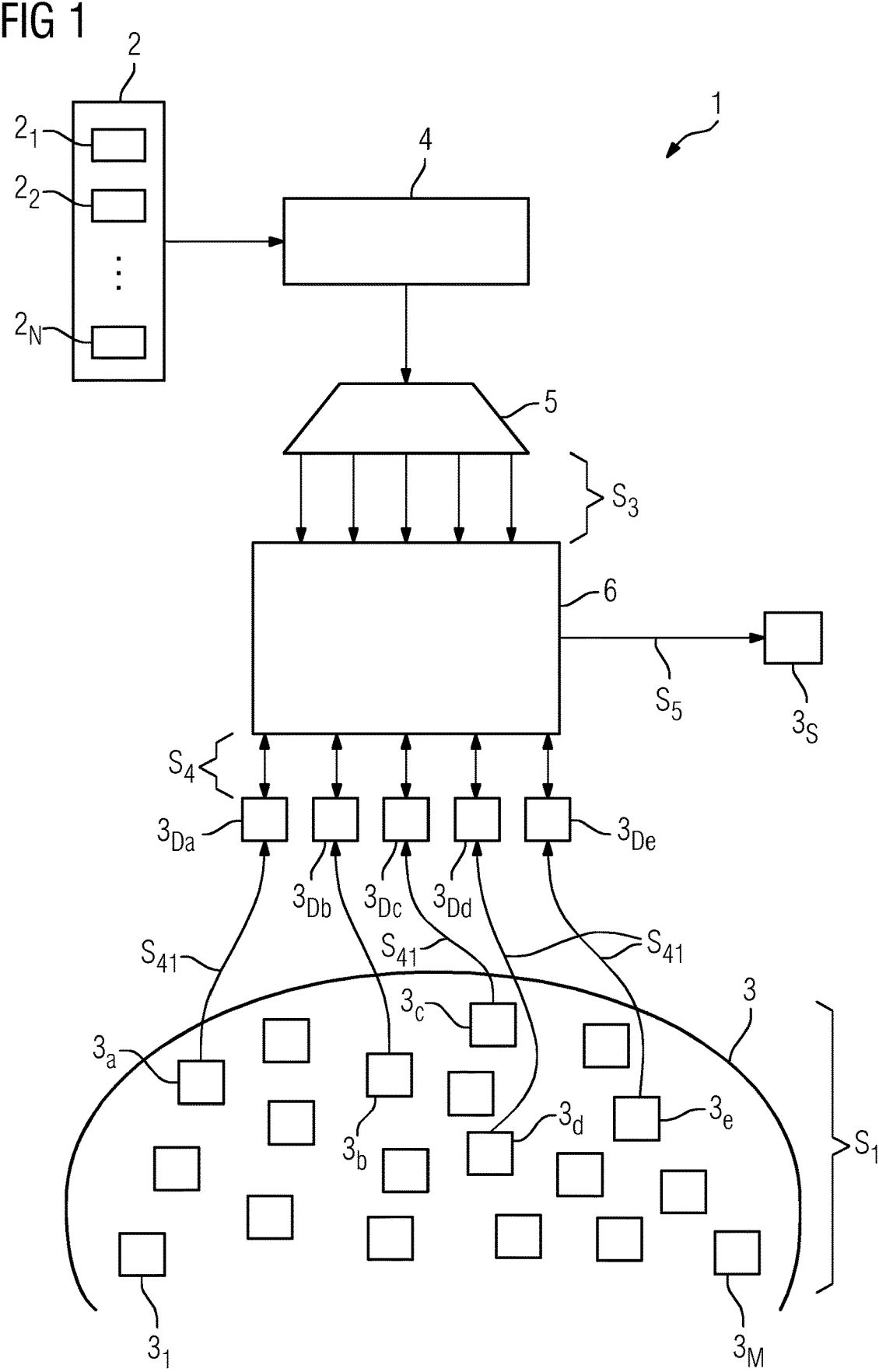
FIG. 1 depicts a diagram illustrating a system for selecting one production module for performing one production step of a production plan according to an embodiment.

FIG. 1 depicts a diagram illustrating a system 1 for selecting one production module for performing one production step of a production plan.

Figure 6:
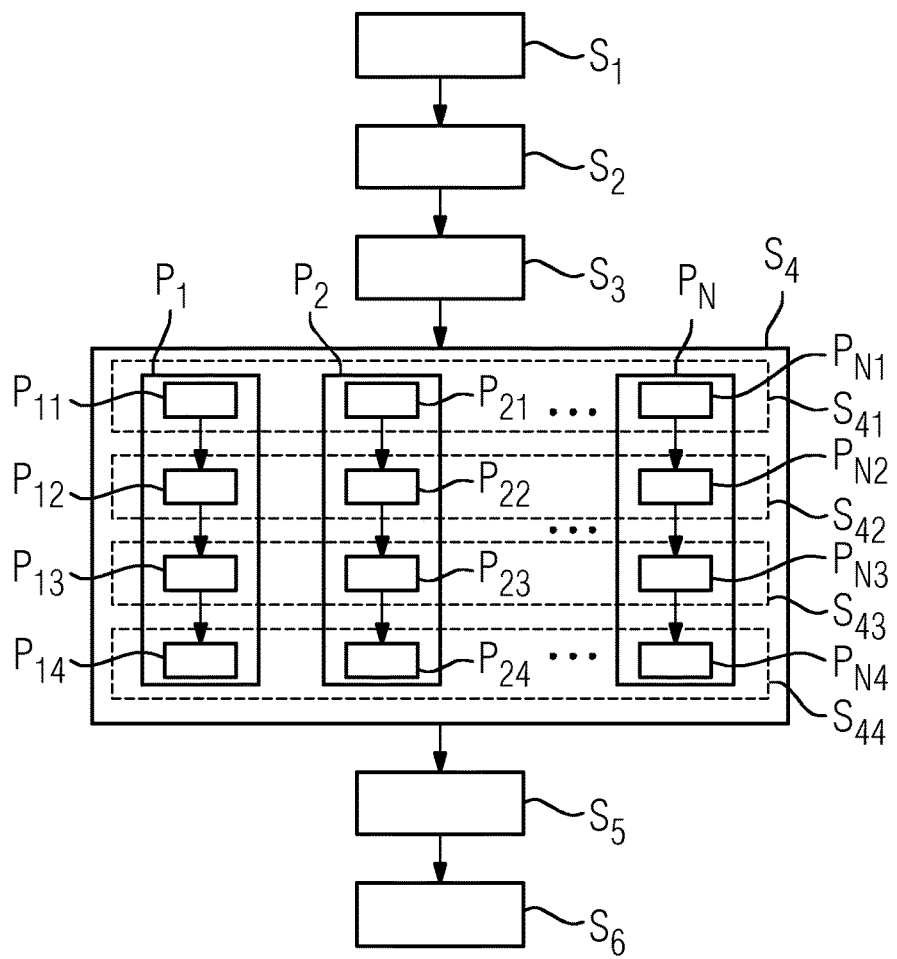
FIG. 6 depicts a flow diagram of a method for manufacturing a product according to an embodiment.

A method for manufacturing a product according to a production plan 2 including a plurality of production steps $2_1$-$2_N$ is described by referring to the blocks of the flow chart of FIG. 6. The method may be configured to be performed as a routine, for example, implemented a computer program.

The system 1 includes the production plan 2, a plurality of production modules 3, a production input 4, a multiplexer device 5 and a control unit 6 (e.g., a controller).

The production plan 2 includes N production steps $2_1$-$2_N$. The production plan 2 may be provided as a listing of production steps $2_1$-$2_N$ that are to be performed in a specific order in order to manufacture a product. The production plan 2 may include a production time-limit $T_{prod}$ before which the product is to be manufacture. At least one of the production steps $2_1$-$2_N$ may include a partial time-limit $T_{part,i}$ before which the respective production step $2_i$ is to be performed. In addition, the production plan 2 may include a maximum cost $C_{max}$.

The production plan may be formed as an array, a list, a table, a schedule, a register, a data sheet and/or a catalog and, for example, provided in an electronic data carrier. Each of the production steps $2_1$-$2_N$ may include one or more production services. For example, one of the production services may include joining, welding, soldering, drilling, milling, cutting, assembling, depositing, deforming, heating, cooling, arranging, stacking, separating, etc.

The production plan 2 is input via a production input 4. For example, the production input 4 may include a user interface and provide an input device. The production input 4 may be configured to transform the production plan 2 into a machine language and/or programming language that is compatible with the control unit 6. The production input 4 evaluates and transmits the production plan 2 to the multiplexer device 5.

At act $S_3$, the multiplexer device splits the N production steps $2_1$-$2_N$ of the production plan 2 into N single production steps $2_{S1}$-$2_{SN}$ and feeds the steps to the control unit 6.

The control unit 6 receives the single production steps $2_{S1}$-$2_{SN}$ from the multiplexer device 5 and determines what production services are to be provided for performing each of the single production steps $2_{S1}$-$2_{SN}$. At act $S_4$, the control unit 6 initiates a negotiation process for each of the single production steps $2_{S1}$-$2_{SN}$. In total, N negotiation processes $P_1$-$P_N$ are simultaneously executed for N single production steps. The N negotiation processes $P_1$-$P_N$ are executed independently from one another. Each negotiation process $P_1$-$P_N$ is executed for selecting one production module out of the plurality of production modules 3 for performing the respective production step.

A negotiation process is a process of finding a matching offer for a given request and/or vice versa. For example, a negotiation process may be executed for finding a matching production module for a given production step and/or vice versa.

The negotiation processes $P_1$-$P_N$ may be performed according to the principles of the double auction, as described above. Accordingly, the negotiation processes $P_1$-$P_N$ may integrate the production steps $2_1$-$2_N$ as potential buyers and a plurality of production modules 3 as potential sellers. Each of the production steps $2_1$-$2_N$ may include individual requirements, for example, including the production and partial time limits $T_{prod}$, $T_{part}$. The plurality of production steps $2_1$-$2_N$, separated by the multiplexer device, are submitted independently from each other to the control unit 6 that acts as a market. At the same time, the production modules $3_1$-$3_M$ submit the operation parameters OP, from which the sets of module parameters are extracted and the costs calculated. The calculated cost may be regarded as the offer in terms of the double auction.

Automated negotiation methods that may be suitable for the negotiation process are disclosed in US 2012/0078769 A1 relating to a method involving trading agents. Action methods disclosed in WO 03/067494 A1, U.S. Pat. No. 8,738,462 B2 or U.S. Pat. No. 7,689,463 B1 and references cited therein may be adapted to perform negotiation processes $P_1$-$P_N$ mentioned herein.

The plurality of production modules 3 may, for example, be provided as a pool of M production modules $3_1$-$3_M$. Each of the production modules $3_1$-$3_M$ is configured to perform at least one production service. At act $S_{41}$, the production modules that are capable of performing the single production steps $2_{S1}$-$2_{SN}$ are designated. For example, in FIG. 2, five production modules 3a-3e are designated for the negotiation process for the production step $2_i$ and become designated production modules $3_{Da}$-$3_{De}$.

A production module that is capable of performing a specific production step may have the availability that is within or before the partial time-limit of the production step and/or the production time-limit of the production plan and be configured to perform all the production services required for performing the specific production step.

For example, each production module 3 of the plurality of production modules 3 self-submit operation parameters OP (e.g., the availability, energy consumption, operation time requirement, temperature, workload, wear, etc.) to the control unit 6. The production modules $3_1$-$3_M$ may be communicatively coupled to the control unit 6 and upload the operation parameters to the control unit 6, for example, via a local area network TCP/IP and/or another telecommunication network. Further, each production module 3 of the plurality of production modules 3 may regularly update (e.g., upload and re-write) corresponding operation parameters on the control unit 6.

The negotiation processes $P_1$-$P_N$ may output a failure F if none of the plurality of production modules 3 are capable of performing at least one of the single production steps $2_{S1}$-$2_{SN}$, for example, if there are no production modules configured for performing the production services required by the single production step and having the availability within or before the production and/or partial time-limit.

A subset of operation parameters $OP(2_i)$ that are relevant for performing the single production step $2_i$ for which the negotiation process $P_1$ is initiated may be determined. The subset of operation parameters $OP(2_i)$ determined as a function of the single production step $2_i$, corresponds to a set of module parameters $MP_i$. Accordingly, the set of module parameters $MP_i$ for the production step $2_i$ are a subset of the operation parameters self-submitted by the plurality of production modules 3. In an act $S_{42}$, the set of module parameters $MP_i$ is assigned to the designated production modules $3_{Da}$-$3_{De}$. Each of the production steps $2_1$-$2_N$ has a respective set of module parameters $MP_1$-$MP_N$, and the composition of the operation parameters OP may be different in different sets of module parameters $MP_1$-$MP_N$.

During each negotiation process $P_1$-$P_N$, the module parameters $MP_1$-$MP_N$ are converted into a cost C (e.g., a quantity that combines the module parameters $MP_1$-$MP_N$). At act $S_{43}$, the cost C is calculated by multiplying each of the module parameters $MP_1$-$MP_N$ with an individual weighting factor W and adding the products up. For example, the cost C may be calculated as $$C = W_t \cdot \frac{t}{T_0} + W_E \cdot \frac{E}{E_0}$$

where $W_t$ and $W_E$ are the weighting factors for operation time and energy consumption, respectively, and $T_0$ and $E_0$ are scaling values for the operation time and the energy consumption, respectively. t and E are the operation parameters submitted by the module parameters $3_1$-$3_M$. For example, if a fast performance of a specific production step is more important than an energy saving performance, the weighting factor $W_t$ may be increased while the weighting factor $W_E$ may be decreased.

For example, the individual weighting factors W may be specified by the production plan 2, the respective single production steps $2_{S1}$-$2_{SN}$, and/or the control unit 6 and may be variable over time.

A maximum cost $C_{max}$ may be assigned to the production plan 2, indicating a highest acceptable value for the calculated cost. At least one of the negotiation processes $P_1$-$P_N$ may output a failure F in case that the calculated cost C for every designated production modules $3_{Da}$-$3_{De}$ exceeds the maximum cost $C_{max}$.

Each of the negotiation processes $P_1$-$P_N$ results in either, at act $S_{44}$, selecting one production module $3_{S1}$-$3_{SN}$, respectively, for performing the respective single production step $2_1$-$2_N$ or outputting a failure F. In case a failure F is output, the production plan 2 may be altered, for example, by changing the production time-limit $T_{prod}$, the partial time-limit(s) $T_{part1}$-$T_{partN}$, and/or the weighting factors W for calculating the cost C.

At act $S_5$, each of the selected production modules $3_{S1}$-$3_{SN}$ is disposed for performing the respective single production step $2_{S1}$-$2_{SN}$.

Figure 2:
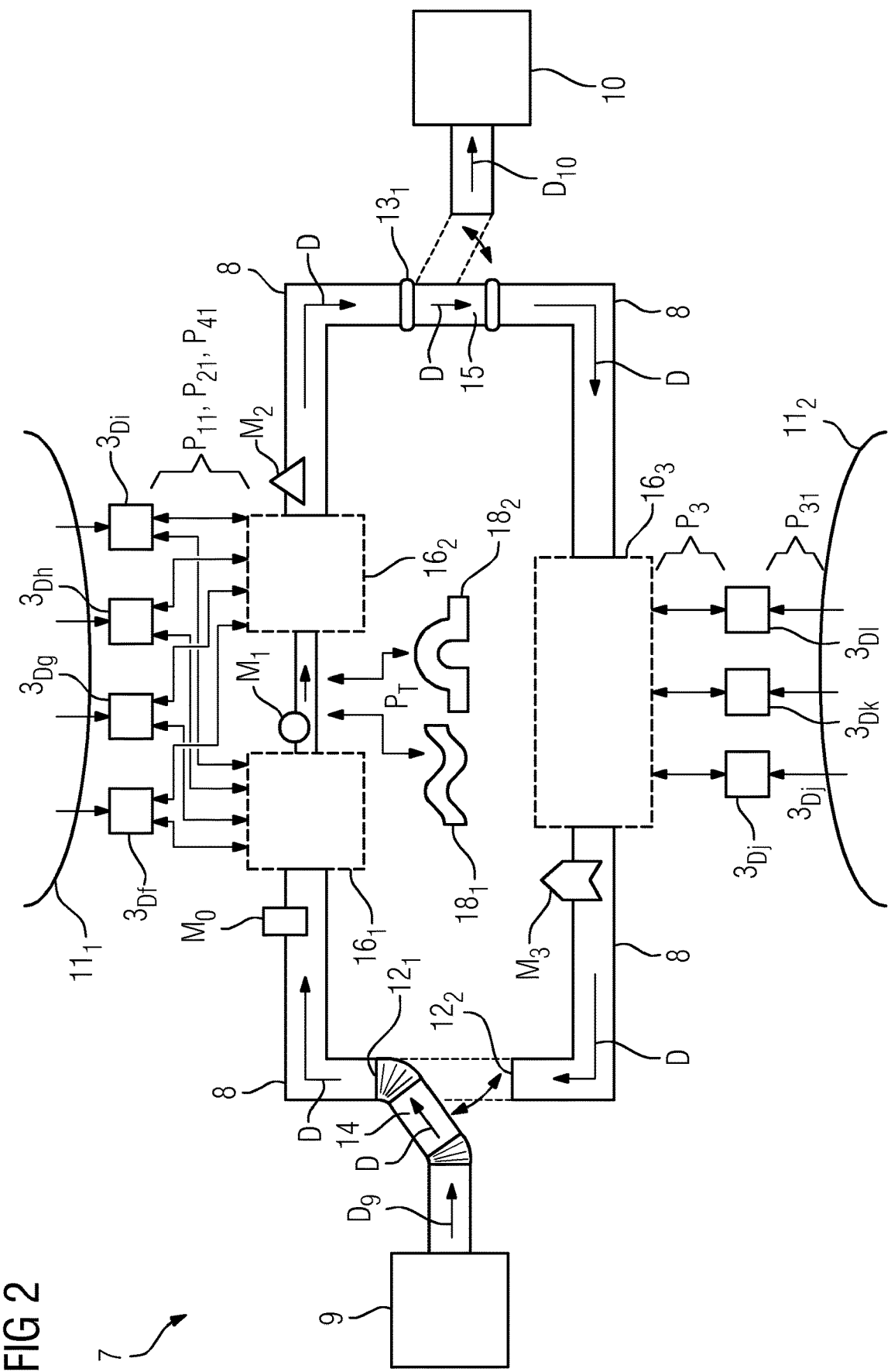
FIG. 2 depicts a schematic view of an embodiment of a manufacturing facility.

FIG. 2 shows a schematic view of an embodiment of a manufacturing facility 7.

In FIG. 2, the steps of the suggested method are described, referring to the blocks of the flow chart of FIG. 6.

The manufacturing facility 7 includes an assembly line 8 that is formed as a loop. The manufacturing facility 7 includes a supply unit 9, a storage unit 10 and at least one pool $11_1$, $11_2$ that, at act $S_1$, provides the plurality of production modules 3 as production resources. The supply unit 9 supplies the assembly line 8 with raw materials $M_0$ that are required for manufacturing a final product $M_F$. The storage unit 10 stores the manufactured final product $M_F$.

The assembly line 8 is interrupted at a first junction between first positions $12_1$, $12_2$ and at a second junction between second positions $13_1$, $13_2$. The assembly line 8 has a flow direction (e.g., a direction in which raw materials, semi-final products, and final products are moved by the assembly line 8). Arrows D indicate the clockwise flow direction of the assembly line 8.

A supply conveyor 14 is pivoted at the first position $12_1$. In FIG. 2, the supply conveyor 14 is arranged so as to connect the supply 9 to the first position $12_1$ of the assembly line 8. The raw materials $M_0$ from the supply unit 9 may be conveyed to the assembly line 8, as indicated by an arrow D9. Alternatively, the supply conveyor 14 may be arranged so as to connect the first positions $12_1$, $12_2$ to each other.

A storage conveyer 15 is pivoted at the second position $13_1$. In FIG. 2, the storage conveyor 15 is arranged so as to connect the second positions $13_1$, $13_2$ to each other. Alternatively, the storage conveyor 15 may be arranged so as to connect the storage unit 10 to the second position $13_1$ of the assembly line 8 in order to convey final products $M_F$ from the assembly line 8 to the storage unit 10, as indicated by an arrow $D_{10}$.

The assembly line 8 includes three manufacturing sites $16_1$-$16_3$ at which one of selected production modules $3_S$ may be positioned and disposed for performing a respective production step. A transportation site 17 is located between the manufacturing sites $16_1$, $16_2$. An auxiliary module (e.g., transportation module) may be positioned at the transportation site 17 so as to transport the raw materials $M_0$, semi-final products $M_1$-$M_3$, and/or final products $M_F$.

The pools $11_1$, $11_2$ may contain different sets of production modules and/or be one and the same pool containing one set of production modules. Further, the pool $11_1$ and/or the pool $11_2$ may include multiple pools of production modules.

By shaping the assembly line as a loop, as shown in FIG. 2, a limited number of manufacturing sites may be used for performing a greater number of production steps. Although the manufacturing site 8 includes three manufacturing sites $16_1$-$16_3$ in FIG. 2, a manufacturing facility may include more or fewer manufacturing sites than three. Further, a manufacturing facility may include a plurality of assembly lines that may be operated either separately or connected to each other.

At each of the manufacturing sites $16_1$-$16_3$, a negotiation process $P_1$-$P_3$ may be executed for selecting one production module for performing a production step $2_i$. During the negotiation process $P_1$, as described above, four production modules $3_{Df}$-$3_{Di}$ are designated, as shown in FIG. 2. For example, the four production modules may be instantiated by four different drills having different operation parameters (e.g., different precisions; different tolerances, different operation speeds, different maintain costs, different energy consumptions and/or different workloads).

As a result of the negotiation process $P_i$, one of the designated production modules $3_{Df}$-$3_{Di}$ is selected and disposed for performing the first production step at the manufacturing site $16_1$. Consequently, the selected production module $3_{S1}$ is positioned at the manufacturing site $16_1$ and is ready for performing the first production step $2_1$.

The raw material $M_0$ is delivered from the supply unit 9 via the supply conveyor 14 and the assembly line 8 to the manufacturing site $16_1$ and undergoes the first production step $2_1$. After the raw material is processed in the first production step $2_1$, the raw material $M_0$ becomes a semi-final product of the first grade $M_1$.

Additionally, the selected production modules $3_{S1}$-$3_{SN}$ that perform one of the production steps $2_1$-$2_N$ may provide and/or add additional raw materials $M_0$ to a semi-final product.

A negotiation process PT is carried out for a transportation step at the transportation site 17 as well. A plurality of auxiliary modules $18_1$, $18_2$ may compete with one another. The plurality of auxiliary modules $18_1$, $18_2$ may include, for example, differently shaped conveyor belt sections and/or different transportation options. Further, the plurality of auxiliary modules $18_1$, $18_2$ may include conveyor belts and/or transportation options of same shape and size, but having different operation parameters OP. The auxiliary module $18_S$ selected during the negotiation process PT transports the semi-final product of the first grade $M_1$ to the manufacturing site $16_2$.

In FIG. 2, the first and second manufacturing steps $2_1$, $2_2$ include the same production services, therefore designating the same set of production modules $3_{Df}$-$3_{Di}$. However, the selected and disposed production module $3_{S1}$, $3_{S2}$ for the first and the second production steps may be different, since the availability and/or the module parameters $MP_1$, $MP_2$ of the production module $3_{S1}$ performing the first production step $2_1$ may be altered since performing the first production step $2_1$.

As a result of the negotiation process $P_2$, one of the designated production modules $3_{Df}$-$3_{Di}$ is selected and disposed for performing the first production step $2_2$ at the manufacturing site $16_2$. Consequently, the selected production module $3_{S2}$ is positioned at the manufacturing site $16_2$ and is ready for performing the second production step $2_2$. The semi-final product of the second grade $M_2$ undergoes the second production step $2_2$ and becomes a semi-final product of the second grade $M_2$.

The semi-final product of the second grade $M_2$ is transported along the assembly line 8 to the storage conveyor 15. If at least one more production step $2_3$-$2_N$ is required to obtain a final product $M_F$, the storage conveyor 15 connects the second positions $13_1$, $13_2$ of the assembly line 8 to each other in order not to lead the semi-final product of the second grade $M_2$ to the storage unit 10.

Several production modules $3_{Df}$-$3_{D1}$ are designated from the pool $11_2$ for performing the third production step $2_3$ at the manufacturing site $16_3$. For example, the designated production modules $3_{Df}$-$3_{D1}$ may be instantiated by different mills. The designated production module matching specific requirements (e.g., having a minimum calculated cost) during the negotiation process $P_3$ is selected and disposed for performing the third production step $2_3$ at the manufacturing site $16_3$.

The semi-final product of the second grade $M_2$ undergoes the third production step $2_3$ at the manufacturing site $16_3$ and becomes a semi-final product of the third grade $M_3$. Afterwards, the semi-final product of the third grade $M_3$ moves along with the assembly line 8 and forwarded by the supply conveyor 14 that is arranged so as to connect the first positions $12_1$, $12_2$ of the assembly line 8 to each other.

Another negotiation process $P_4$ is executed and results in another designated production module $3_{S4}$ being selected and disposed for performing a fourth production step $2_4$ at the manufacturing site $16_1$. If the production plan 2 includes four production steps $2_1$-$2_4$, i.e. N=4, the semi-final product of the third grade $M_3$ undergoes the fourth production step $2_4$ and becomes the final product $M_F$. In case that the production plan 2 for manufacturing the final product $M_F$ includes more production steps (e.g., N>4), the final product $M_F$ is manufactured by running through more production steps $2_5$-$2_F$ along the loop formed by the assembly line 8.

If the final product $M_F$ is manufactured after processing at the manufacturing site $16_1$, the manufacturing site $16_2$ may become idle (e.g., no production module is positioned at the manufacturing site $16_2$) and the final product $M_F$ passes through the site without processing.

The transportation site 17 may be unchanged after passing by the semi-product of the first grade $M_1$, and/or another negotiation process PT may be executed in order to select a new auxiliary module $18_1$, $18_2$ for transporting the final product $M_F$ from the manufacturing site $16_1$ to the manufacturing site $16_2$.

The storage conveyor 15 connects the second position $13_1$ of the assembly line 8 to the storage unit 10. The final product $M_F$ is transported to the storage unit 10 where the final product may either be stored and/or leave the manufacturing facility 7 (e.g., in order to be delivered to a customer).

Figure 3:
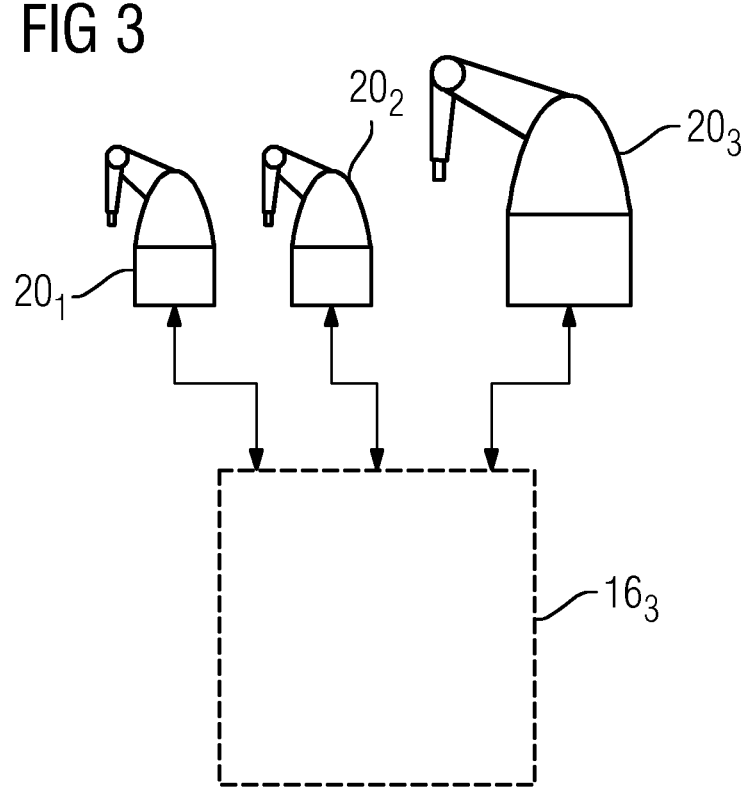
FIG. 3 depicts a schematic view of competing production modules for a manufacturing site according to an embodiment.

FIG. 3 shows a schematic view of competing production modules for a manufacturing site.

For example, three different robot arms $20_1$-$20_3$ that are configured to weld two work pieces with each other may compete with each other for selecting and disposing for performing a production step at the manufacturing site $16_3$. The robot arms $20_1$ and $20_2$ may be of similar size, while robot arm $20_3$ may be bigger. Despite of the similar size, the robot arms $20_1$ and $20_2$ may perform with different qualities (e.g., different accuracies), different error rates, and/or different speeds. The robot arm $20_3$ may work faster than the robot arms $20_1$, $20_2$ but consume more energy, and be more expensive to operate.

During the negotiation process for the production step at the manufacturing site $16_3$, each of the module parameters, the quality, speed and power consumption, may be multiplied by an individual weighting factor in order to calculate the cost. The robot arm having the minimum calculated cost is selected and disposed for performing the manufacturing step at the manufacturing site $16_3$.

Figure 4:
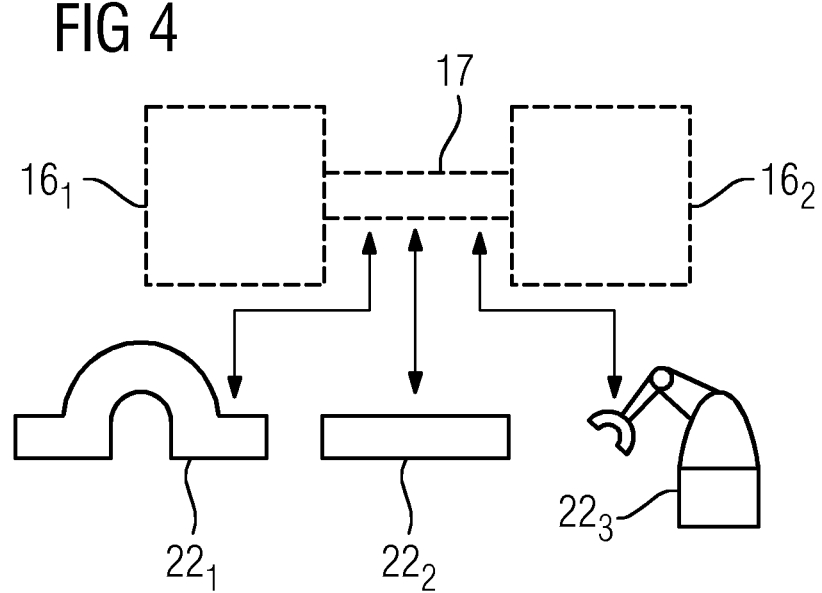
FIG. 4 depicts a schematic view of competing auxiliary modules for a transportation site according to an embodiment.

FIG. 4 shows a schematic view of competing auxiliary modules for a transportation site.

In FIG. 4, three different auxiliary modules $21_1$-$21_3$ compete with each other for selecting and disposing for positioning at the transportation site 17. The auxiliary modules $21_1$, $21_2$ are conveyor belts of different shapes and lengths. The auxiliary module $21_3$ is a robot arm having a grappler that is suitable for transporting raw materials, semi-final products and/or final products between the two manufacturing sites $16_1$, $16_2$.

A negotiation process is executed for the transportation. The auxiliary module having the minimal calculated cost from the negotiation process is selected and disposed for positioning at the transportation site 17.

Figure 5:
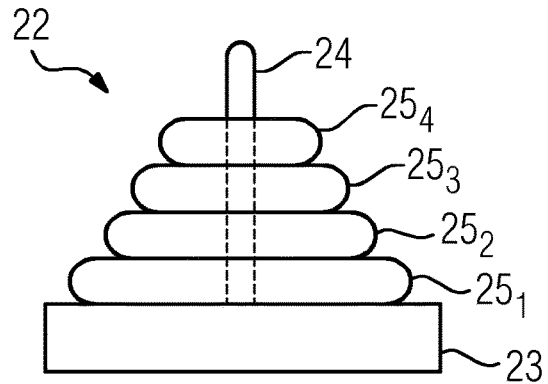
FIG. 5 depicts an embodiment of a product.

FIG. 5 shows an embodiment of a product $2_2$.

The product $2_2$ includes a base plate $2_3$ that is, for example, located horizontally on top of a ground. A pole $2_4$ is located at the center of the base plate $2_3$ and arranged vertically so as to stand perpendicular to the base plate $2_3$.

The base plate $2_3$ and the pole $2_4$ may be pre-produced and/or provided by the supply unit 9.

The product plan for manufacturing the product $2_2$ includes four circular discs $25_1$-$25_4$, each disc having a different diameter from the other discs. All four discs $25_1$-$25_4$ have a fixed thickness. Further, all four discs $25_1$-$25_4$ have a circular opening at the center with a fixed hole diameter. The discs $25_1$-$25_4$ are arranged parallel to one another on top of the base plate $2_3$ such that the circular holes at the center of the disks $25_1$-$25_4$ are penetrated by the pole $2_4$. The production plan provides that the discs $25_1$-$25_4$ are placed on top of the base plate $2_3$ such that a disc diameter of the discs $25_1$-$25_4$ decreases from the bottom upwards.

The production plan may include four different production steps $2_1$-$2_4$, where each production step is configured to manufacture one of the discs $25_1$-$25_4$. For example, a manufacturing order (e.g., an order in which the production steps are performed) is included in the production plan.

Each of the production steps $2_1$-$2_4$ for manufacturing the discs $25_1$-$25_4$ may include the production services of: shaping a circular disc having the fixed thickness and an individual disc diameter and drilling a hole having the fixed hole diameter at the center of the circular disc.

For each of the production steps $2_1$-$2_4$, a mill and a drill are used for shaping the circular disc and for drilling a hole, respectively.

A plurality of mills may be provided in a mill pool $11_M$, and a plurality of drills may be provided in a drill pool $11_D$. Each mill and drill has an individual operation parameters (e.g., a precision, an accuracy, an error rate, an operation speed, an energy consumption, a maintaining cost, etc.), and self-submits the operation parameters to a control unit in a regular time interval.

After receiving the production plan including the production steps, the control unit designates those mills and drills out of the respective pools that are capable of performing the services to be provided. One of the designated mills and drills are then selected in a negotiation process for performing the respective production service.

Additionally, manufacturing the product may use four different transportation steps, for example if the base plate $2_3$ and the pole $2_4$ are located at an assembly site that is spaced from the manufacturing sites where the discs $25_1$-$25_4$ are manufactured. For example, one transportation step may be used after each manufacturing step. For manufacturing the product $2_2$, the manufactured discs $25_1$-$25_4$ are to be placed on top of the base plate $2_3$ in the following order: $25_1$-$25_2$-$25_3$-$25_4$.

FIG. 6 shows a flow diagram of a method for manufacturing a product according to a production plan. The acts may be understood as computer readable program instructions or program modules, routines, or a set of instructions.

At act $S_1$, a plurality of production modules are provided as production resources.

At act $S_2$, each production module of the plurality of production modules self-submit operation parameters, for example, to a control unit.

At act $S_3$, a plurality of production steps of the production plan are split into single production steps.

At act $S_4$, a negotiation process P is executed for each of the single production steps of the production plan.

The negotiation process P includes four acts. At act $S_{41}$, production modules that are capable of performing the production step are designated.

At act $S_{42}$, module parameters are assigned to each of the designated production modules.

At act $S_{43}$, a cost is calculated for each of the designated production modules based on the parameter modules (e.g., multiplied with individual weighting factors).

At act $S_{44}$, one of the designated production modules is selected for performing the single production step.

At act $S_5$, the production modules each selected for performing one production step are disposed for performing the respective manufacturing step.

At act $S_6$, the product is manufactured by performing the manufacturing steps by the disposed production modules.

The disclosed aspects methods and devices for facilitating a manufacturing process may be implemented as a system, a method, and/or a computer program product. The flow chart according to FIG. 6 may be implemented as a computer program product including a computer readable storage medium or media (e.g., a non-transitory computer-readable storage medium) having computer readable program instructions thereon for causing a processor to carry out embodiments.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for manufacturing a product according to a production plan including a plurality of production steps, the method comprising:
   providing a plurality of production modules;
   splitting the plurality of production steps into individual production steps;
   independently and simultaneously executing a negotiation process for selecting a production module from the plurality of production modules for each individual production step of the plurality of production steps, wherein each negotiation process comprises:
      designating one or more production modules from the plurality of production modules configured to perform the respective production step;
      assigning a plurality of module parameters to each production module of the designated one or more production modules, the plurality of module parameters comprising an operation time and an energy consumption for a respective production step;
      assigning an individual weighting factor to each module parameter of the plurality of module parameters based on an importance of each module parameter;
      calculating a cost for each of the designated production modules based on the respective plurality of module parameters of the respective production module, wherein the calculation of the cost for each designated production module comprises multiplying each module parameter by the assigned respective individual weighting factor to provide a product for each production module and adding together the products;
      selecting one of the designated production modules for performing the respective production step as a function of the calculated cost; and
      disposing the selected production modules, wherein each selected production module is suitable for performing one of the production steps to manufacture the product according to the production plan.

2. The method of claim 1, further comprising:
   manufacturing the product by performing the plurality of production steps according to the production plan.

3. The method of claim 1, further comprising:
   assigning a production time-limit to the production plan,
   wherein the designating of the one or more production modules comprises designating production modules configured to perform the production step within the production time limit.

4. The method of claim 3, further comprising:
   altering the production time-limit when the negotiation process outputs a failure signal.

5. The method of claim 1, further comprising:
   assigning at least one partial time-limit to at least one production step of the plurality of production steps,
   wherein the designating of the one or more production modules comprises designating production modules configured to perform the respective production step within the respective partial time-limit.

6. The method of claim 1, wherein the negotiation process further comprises outputting a failure signal when no production module is designated.

7. The method of claim 1, wherein the production plan includes a maximum cost, and
   wherein the negotiation process further comprises outputting a failure signal when the calculated cost for the designated production modules exceeds the maximum cost.

8. The method of claim 7 further comprising:
   withdrawing the production plan when the negotiation process outputs the failure signal.

9. The method of claim 1, wherein the selecting of the designated production module comprises selecting a designated production module having a minimum calculated cost.

10. The method of claim 1, further comprising:
    providing, by the plurality of production modules, an availability and the plurality of module parameters of each production module of the plurality of production modules.

11. The method of claim 1, wherein at least one production module of the plurality of production modules is selected, disposed, or both selected and disposed for performing production steps of the plurality of production steps of the production plan.

12. A manufacturing facility comprising:
    a production input configured to receive a production plan for manufacturing a product, the production plan comprising a plurality of production steps;
    a plurality of production modules, wherein each production module of the plurality of production modules includes a plurality of module parameters, wherein the plurality of module parameters comprises an operation time and an energy consumption for a respective production step of the plurality of production steps;

a device configured to split the plurality of production steps of the production plan into individual production steps and input the individual production steps to a controller; and the controller configured to execute, independently and simultaneously, a plurality of negotiation processes, each negotiation process of the plurality of negotiation processes comprising: designating one or more production modules from the plurality of production modules configured to perform the respective production step; assigning a plurality of module parameters to each production module of the designated one or more production modules; assigning an individual weighting factor to each module parameter of the plurality of module parameters based on an importance of each module parameter;

calculating a cost for each of the designated production modules based on the respective plurality of module parameters of the respective production module comprising multiplying each module parameter by the assigned respective individual weighting factor to provide a product for each production module and adding together the products; and selecting one of the designated production modules for performing the respective production step as a function of the calculated cost, wherein each production module of the plurality of production modules is configured to submit the plurality of module parameters to the controller, and wherein the selected production modules are configured to manufacture the product, the manufacture of the produce comprising performance of the individual production steps.

13. The manufacturing facility of claim 12, wherein controller is further configured to execute the plurality of negotiation processes according to a double auction.

14. A device for selecting a production plan for manufacturing a product, the device comprising:

a memory configured to store a plurality of module parameters for a plurality of production modules; and a processor configured to split a plurality of production steps into individual production steps and independently and simultaneously execute a plurality of negotiation processes, each negotiation process configured to select a production module from a plurality of production modules for an individual production step of the plurality of production steps, wherein the negotiation process comprises:

designation of one or more production modules configured to perform the production step from the plurality of production modules;

assignment of the plurality of module parameters to each production module of the designated one or more production modules, the plurality of module parameters comprising an operation time and an energy consumption for a respective production step;

assignment of an individual weighting factor to each module parameter of the plurality of module parameters based on an importance of each module parameter;

calculation of a cost for each of the designated production modules based on the respective plurality of module parameters of the respective production module, wherein the calculation of the cost for each designated production module comprises multiplying each module parameter by the assigned respective individual weighting factor to provide a product for each production module and adding together the products; and selection of one of the designated production modules for performing the production step as a function of the calculated cost.

15. The device of claim 14, further comprising:

a transmitter configured to transmit each respective individual production step to the respective selected production module in order to manufacture the product.

16. The device of claim 14, wherein the processor is further configured to:

assign a production time-limit to the production plan, wherein the designation of the production modules comprises designation of production modules configured to perform the individual production steps within the production time limit.

17. The device of claim 16, wherein the processor is further configured to:

alter the production time limit when the negotiation process outputs a failure signal.

* * * * *